April 2, 1935.  A. C. ZIMMERMAN  1,996,136
APPARATUS FOR PRODUCING SOFT BOILER WATER
Filed April 30, 1931
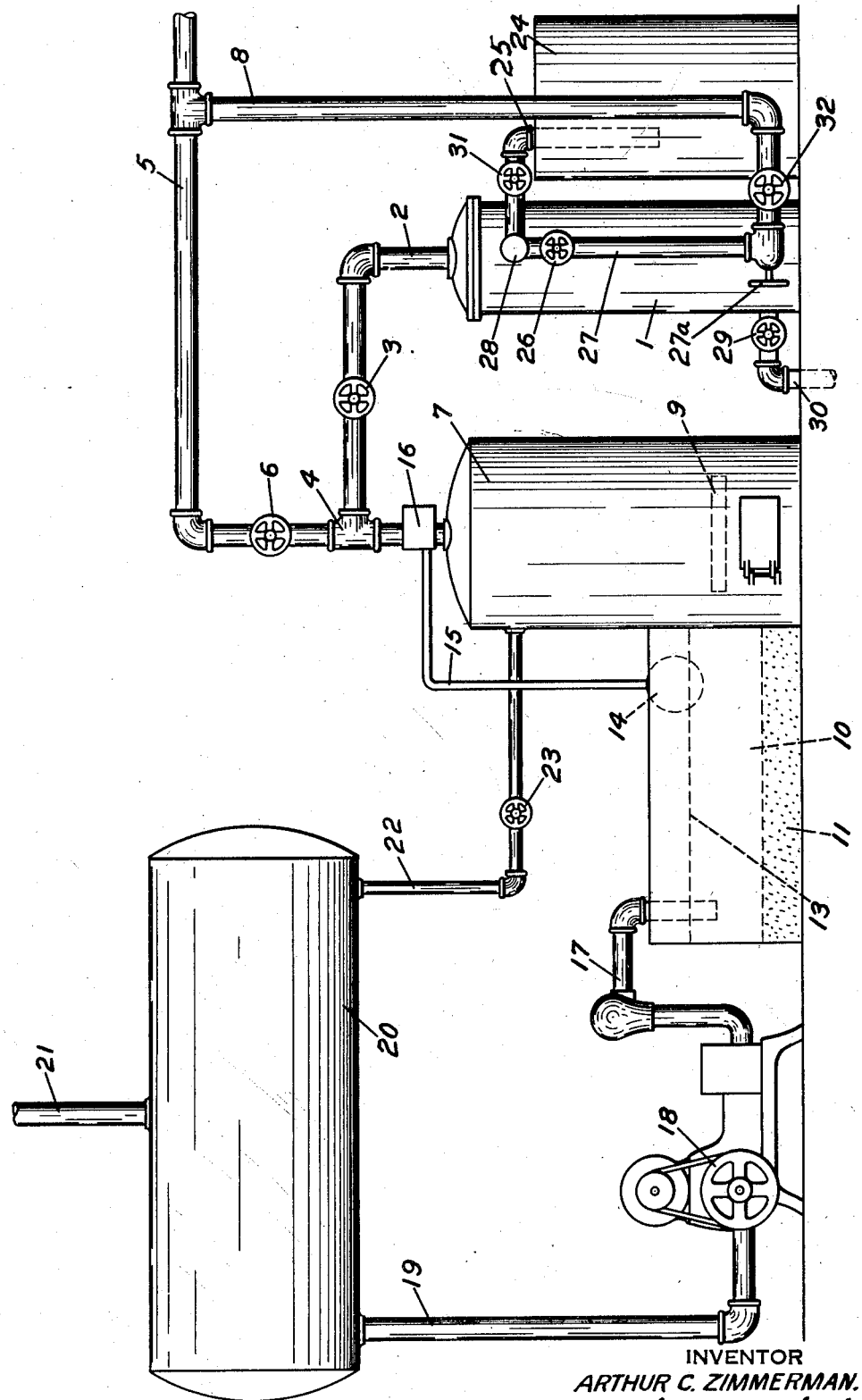
INVENTOR
ARTHUR C. ZIMMERMAN.
BY Toulmin & Toulmin
ATTORNEY Patented Apr. 2, 1935

1,996,136

UNITED STATES PATENT OFFICE 1,996,136

APPARATUS FOR PRODUCING SOFT BOILER WATER

Arthur C. Zimmerman, Dayton, Ohio, assignor to The Duro Company, Dayton, Ohio, a corporation of Ohio Application April 30, 1931, Serial No. 533,873

4 Claims. (Cl. 210—16)

My invention relates to a process and apparatus for practicing a process for producing soft water for use in boilers by the reaction of the alkalinity of the water from the boiler with the water coming into the feed water heater.

It is my object to provide a method of deconcentration applicable to various boiler installations on waters of varying compositions.

Referring to the drawing, the figure indicates diagrammatically a typical mechanism for the practice of my process.

Most waters throughout the country contain scale forming substances which deposit in boilers. Some waters are very corrosive to boiler shells due to dissolved gases such as carbon dioxide and oxygen. Some waters cause foaming and priming in boilers due to various reasons, one of which is the concentration of alkalinity or a low ratio of sulphates to alkalinity. High alkalinity or causticity in boilers likewise is said to cause a serious embrittlement in boiler plate.

In order to lessen these objections continuous frequent blowdowns are necessary, accompanied by either a great heat loss or high water consumption and even then, an ideal water is not obtained.

The method herein proposed eliminates the scale by producing a soft water by the reaction of the alkalinity of the water from the boiler with the water coming into the feed water heater.

The alkalinity of the boiler water consists of sodium carbonate and sodium hydroxide, and if these are allowed to accumulate beyond a certain point, foaming and priming occur in the boiler. If these are allowed to react with the hardness in the water, the alkalinity or causticity is thereby reduced, according to the following:

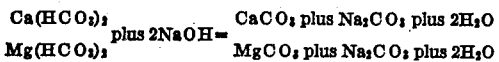

or temporary hardness (bicarbonates of calcium and magnesium) react with the causticity (sodium hydroxide formed in boiler) to throw down calcium and magnesium carbonates as a sludge and a resulting molecule of sodium carbonate which will react with the permanent hardness (sulphates of calcium and magnesium) as follows:

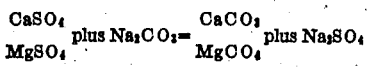

or the permanent hardness reacts with the alkalinity (sodium carbonate formed in the boiler) to throw down calcium and magnesium carbonates as a sludge and form $Na_2SO_4$ which remains in solution and which maintains a high sulphate-alkalinity ratio. By bringing this water from the boiler into the feed water heater, very little heat is lost since it is expended in bringing the feed water to the desired temperature.

In order to practice this invention, I have provided a water softener of the base exchange type designated 1 which furnishes a part of the soft water required through the pipe 2 controlled by the valve 3 to the T-fitting 4, where it is joined by hard water entering through the pipe 5 and controlled by the valve 6. This joined hard and soft water, as for instance in the proportions of 20% soft water and 80% hard water, enters the feed water heater 7. The hard water line 5 is provided with a line 8 which supplies the hard water to the bottom of the softener 1.

The feed water heater having combined hard and soft water in it, is heated by a suitable heater designated 9. The feed water heater 7 is in communication with a settling tank 10. This settling tank provides for the precipitation of the precipitant 11 in the bottom thereof. The level of the water in the tank is indicated at 13. A float 14 rests in this water and is actuated by the varying level 13 through the float arm 15 so as to control the valve 16 through which the combined hard and soft water is making its entrance into the feed water heater. Fluid from the settling tank is drawn through the pipe 17 by the pump 18, discharged through the line 19 as deconcentrated water to the boiler 20, which is heated by a suitable source of heat (not shown) and from which steam is being generated, making its exit through the pipe 21. Concentrate is removed from the boiler through the line 22 controlled by the valve 23 and discharged into the top of the feed water heater for mixture with the hard and soft water heretofore referred to.

The zeolite water softener 1 is associated with a regenerating brine tank 24 from which brine is drawn through the pipe 25 when the valve 26 is opened and water is allowed to pass upwardly through the pipe 27 into the top of the softener. This induces the flow of brine to the pipe 25 by reason of the flow of incoming water past the injector 28. This carries salt water to the top of the zeolite bed, through which it passes downwardly to the drain valve 29 and drain line 30 to the sewer. The valve 31 may then be closed after regeneration has taken place, the brine thereby shut off, but the incoming water will be allowed to pass through the zeolite and out the drain until the salt water is washed out.

Thereupon the valve 26 is closed and the valve 27a is opened. The valve 27a is in a connection between the elbow at the lower end of the pipe 17 and the tank 1. By means of this valve the admission of water to the lower end of tank 1 may be controlled and regulated. The valve 32 is used to close the pipe 8 so that no hard water can pass through this pipe into the tank 1.

*Operation*

The concentrated hot water from the boiler is delivered through the pipe 22 to the feed water heater 7. The amount so delivered varies with the average amount of feed water delivered to the boiler. If desired, the valve 23 which controls this amount can be automatically controlled. The hard water, the soft water and concentrated hot water from the boiler are mixed and heated in the feed water heater 7. The settling tank 10 is untilized to eliminate the sludge 11 when the mixture of hard and soft water meets the concentrate water from the boiler. The pump 18 or an injector can be used to return the deconcentrated clear water to the boiler. This method of deconcentration can be applied to various boiler installations and on waters of varying compositions. The amounts of hard and soft water fed to the feed water heater depends on the kind and amounts of substances in the water to be used and upon the total of feed water necessary to supply the boiler. The feed water heater may be of the open or closed type, that is, of the pressure or the atmospheric pressure type.

I desire to comprehend within my invention such modifications as may be clearly embraced within my claims and the scope of my invention.

Having thus fully described my invention, what I claim as new and desire to secure by Letters Patent, is:

1. In combination, a means of supplying hard water, means of supplying soft water, a feed water heater for receiving said waters, a boiler, means of withdrawing concentrate from said boiler and delivering to the feed water heater, a settling tank associated with said feed water heater, and means of removing liquid from the settling tank and re-delivering it to the boiler.

2. In combination, a means of supplying hard water, means of supplying soft water, a feed water heater for receiving said waters, a boiler, means of withdrawing concentrate from said boiler and delivering to the feed water heater, a settling tank associated with said feed water heater, and means of removing liquid from the settling tank and re-delivering it to the boiler, and means of regulating the proportions of hard, soft and concentrate waters delivered to the feed water heater.

3. In combination, a means of supplying hard water, means of supplying soft water, a feed water heater for receiving said waters, a boiler, means of withdrawing concentrate from said boiler and delivering to the feed water heater, a settling tank associated with said feed water heater, and means of removing liquid from the settling tank and re-delivering it to the boiler, and means of regulating the proportions of hard, soft and concentrate waters delivered to the feed water heater, a float control valve adapted to regulate the admission of hard and soft water to the feed water heater depending upon the heighth of liquid in the settling tank.

4. In combination, a water softening apparatus, means associated therewith for regenerating the water softening material, means of supplying hard water for alternately passing through the water softener to be softened and for drawing regenerating material through the water softener, a feed water heater connected to the outlet of the water softener, means of supplying hard water to the feed water heater, a boiler, means of withdrawing concentrate from said boiler and delivering to the feed water heater, means of settling the contents of the feed water heater, and means of delivering the liquid so settled back to the boiler.

ARTHUR C. ZIMMERMAN.